US00RE45153E

(19) United States
(12) Reissued Patent
Hendrickson et al.

(10) Patent Number: US RE45,153 E
(45) Date of Reissued Patent: *Sep. 23, 2014

(54) FIBER OPTIC CABLE DISTRIBUTION BOX

(75) Inventors: Daniel Hendrickson, Roswell, GA (US); Hongbo Zhang, Duluth, GA (US)

(73) Assignee: ADC Telecommunications, Inc., Berwyn, PA (US)

( * ) Notice: This patent is subject to a terminal disclaimer.

(21) Appl. No.: 13/091,851

(22) Filed: Apr. 21, 2011

Related U.S. Patent Documents

Reissue of:
(64) Patent No.: 7,522,806
Issued: Apr. 21, 2009
Appl. No.: 12/156,297
Filed: May 30, 2008

U.S. Applications:
(63) Continuation of application No. 11/728,785, filed on Mar. 27, 2007, now Pat. No. 7,400,814.

(60) Provisional application No. 60/880,169, filed on Jan. 13, 2007.

(51) Int. Cl.
*G02B 6/00* (2006.01)

(52) U.S. Cl.
USPC ..... 385/135; 385/134; 385/136; 385/137

(58) Field of Classification Search
USPC ..... 385/134, 135, 136, 137
See application file for complete search history.

(56) References Cited

U.S. PATENT DOCUMENTS 1,276,825 A 8/1918 Swopo
1,442,999 A 1/1923 Boardman et al.
1,446,410 A 2/1923 McCormick et al.
1,474,580 A 11/1923 Clark et al.
RE20,995 E 2/1939 Beasley
2,502,496 A 4/1950 Wickman
2,521,226 A 9/1950 Keller (Continued)

FOREIGN PATENT DOCUMENTS

DE 3841607 6/1990
DE 3841607 A1 6/1990

(Continued)

OTHER PUBLICATIONS

Corning Cable Systems, Wall-Mountable Connector Housings (WCH), at www.corningcablesystymes.com (undated).

(Continued)

*Primary Examiner* — Jennifer Doan
(74) *Attorney, Agent, or Firm* — Merchant & Gould P.C.

(57) ABSTRACT

A fiber optic cable distribution box has an interface compartment for interfacing a first set of fibers when routed inside the compartment, with a second set of fibers associated with a fiber optic cable that is routed to the box. A drum region is disposed beneath the interface compartment. The drum region includes a cylindrical wall for supporting a fiber optic cable wound about the wall. The drum region is formed so that the box can turn about the axis of the cylindrical wall when a cable is paid out from the drum region. The interface compartment and the drum region are constructed so that the first set of fibers inside the interface compartment, originate from an inside end portion of the cable wound on the drum region.

27 Claims, 7 Drawing Sheets

(56) References Cited

U.S. PATENT DOCUMENTS

| | | | | |
|---|---|---|---|---|
| 2,727,703 | A | 12/1955 | Bonnett | |
| 3,131,729 | A | 5/1964 | Rudolf | |
| 3,657,491 | A | 4/1972 | Ryder et al. | |
| 3,667,417 | A | 6/1972 | Clinkenbeard | |
| 3,920,308 | A | 11/1975 | Murray | |
| 3,940,086 | A | 2/1976 | Stoqulet | |
| 4,053,118 | A | 10/1977 | Aikins | |
| 4,081,258 | A | 3/1978 | Goell et al. | |
| 4,384,688 | A | 5/1983 | Smith | |
| 4,587,801 | A | 5/1986 | Missout et al. | |
| 4,635,875 | A | 1/1987 | Apple | |
| 4,666,237 | A | 5/1987 | Mallinson | |
| 4,767,073 | A | 8/1988 | Malzacher | |
| 4,869,437 | A | 9/1989 | Berz et al. | |
| 4,883,337 | A | 11/1989 | Dahlgren | |
| 4,913,369 | A | 4/1990 | Lia et al. | |
| 4,939,798 | A | 7/1990 | Last | |
| 4,940,859 | A | 7/1990 | Peterson | |
| 4,976,510 | A | 12/1990 | Davila et al. | |
| 5,016,554 | A | 5/1991 | Harris et al. | |
| 5,022,600 | A | 6/1991 | Blane et al. | |
| 5,066,256 | A | 11/1991 | Ward | |
| 5,069,523 | A | 12/1991 | Finzel et al. | |
| 5,074,863 | A | 12/1991 | Dines | |
| 5,185,843 | A | 2/1993 | Aberson et al. | |
| 5,265,815 | A | 11/1993 | Soyka et al. | |
| 5,280,861 | A | 1/1994 | Corriveau | |
| 5,317,663 | A | 5/1994 | Beard et al. | |
| 5,326,040 | A | 7/1994 | Kramer | |
| 5,335,874 | A | 8/1994 | Shrum et al. | |
| 5,494,234 | A | 2/1996 | Kramer | |
| 5,494,446 | A | 2/1996 | DeLucia et al. | |
| 5,497,444 | A | 3/1996 | Wheeler | |
| 5,519,275 | A | 5/1996 | Scott et al. | |
| 5,522,561 | A | 6/1996 | Koyamatsu et al. | |
| 5,544,836 | A | 8/1996 | Pera | |
| 5,551,545 | A | 9/1996 | Gelfman | |
| 5,638,481 | A | 6/1997 | Arnett | |
| 5,657,412 | A | 8/1997 | Caudrelier | |
| 5,703,990 | A | 12/1997 | Robertson et al. | |
| 5,709,347 | A | 1/1998 | Hoffmann et al. | |
| 5,717,810 | A | 2/1998 | Wheeler | |
| 5,718,397 | A | 2/1998 | Stevens | |
| 5,749,148 | A | 5/1998 | White et al. | |
| 5,787,219 | A | 7/1998 | Muellet et al. | |
| 5,915,640 | A | 6/1999 | Wagter et al. | |
| 5,987,203 | A | 11/1999 | Abel et al. | |
| 5,992,787 | A | 11/1999 | Burke | |
| 6,220,413 | B1 | 4/2001 | Walters et al. | |
| 6,315,598 | B1 | 11/2001 | Elliot et al. | |
| 6,347,462 | B1 * | 2/2002 | Steinich | 33/756 |
| 6,494,396 | B2 | 12/2002 | Sugata | |
| 6,522,826 | B2 | 2/2003 | Gregory | |
| 6,551,237 | B2 | 4/2003 | Matsui | |
| 6,554,221 | B2 | 4/2003 | Hinds | |
| 6,591,051 | B2 | 7/2003 | Solheid et al. | |
| 6,616,080 | B1 | 9/2003 | Edwards et al. | |
| 6,669,129 | B1 | 12/2003 | Shah | |
| 6,711,339 | B2 | 3/2004 | Puetz et al. | |
| 6,834,517 | B1 | 12/2004 | Sheehy, Jr. | |
| 6,856,748 | B1 | 2/2005 | Elkins, II et al. | |
| 6,915,058 | B2 | 7/2005 | Pons | |
| 6,927,340 | B1 | 8/2005 | Binder et al. | |
| 6,937,725 | B2 | 8/2005 | Liao | |
| 6,948,680 | B2 | 9/2005 | Ganster | |
| 6,997,410 | B1 | 2/2006 | Huang | |
| 7,000,863 | B2 | 2/2006 | Bethea et al. | |
| 7,011,538 | B2 | 3/2006 | Chang | |
| 7,016,590 | B2 | 3/2006 | Tanaka et al. | |
| 7,017,721 | B1 | 3/2006 | Bradford et al. | |
| 7,220,144 | B1 | 5/2007 | Elliot et al. | |
| 7,315,681 | B2 | 1/2008 | Kewitsch | |
| 7,346,253 | B2 | 3/2008 | Bloodsworth et al. | |
| 7,364,108 | B2 | 4/2008 | Kim et al. | |
| 7,369,739 | B2 | 5/2008 | Kline et al. | |
| 7,397,997 | B2 | 7/2008 | Ferris et al. | |
| 7,400,814 | B1 | 7/2008 | Hendrickson et al. | |
| 7,477,829 | B2 | 1/2009 | Kaplan | |
| 7,519,258 | B2 | 4/2009 | Wilken et al. | |
| 7,522,806 | B2 | 4/2009 | Hendrickson et al. | |
| 7,533,472 | B2 * | 5/2009 | Birchinger et al. | 33/756 |
| 7,533,841 | B1 | 5/2009 | Harrison et al. | |
| 7,546,018 | B2 | 6/2009 | Hendrickson et al. | |
| 7,676,136 | B2 | 3/2010 | Wakileh et al. | |
| 7,756,379 | B2 | 7/2010 | Kowalczyk et al. | |
| 7,809,234 | B2 | 10/2010 | Smith et al. | |
| 7,894,701 | B2 | 2/2011 | Kowalczyk et al. | |
| 2001/0048044 | A1 | 12/2001 | Sugata | |
| 2002/0003186 | A1 | 1/2002 | Hinds | |
| 2002/0023814 | A1 | 2/2002 | Poutiatine | |
| 2002/0126980 | A1 | 9/2002 | Holman et al. | |
| 2002/0164121 | A1 | 11/2002 | Brennan et al. | |
| 2002/0171002 | A1 | 11/2002 | Krestsch et al. | |
| 2003/0037480 | A1 | 2/2003 | Davis | |
| 2004/0170369 | A1 | 9/2004 | Pons | |
| 2004/0244430 | A1 | 12/2004 | Sheehy et al. | |
| 2005/0213920 | A1 | 9/2005 | Tanaka et al. | |
| 2005/0247136 | A1 | 11/2005 | Cross et al. | |
| 2005/0258411 | A1 | 11/2005 | Zeitler | |
| 2006/0008231 | A1 | 1/2006 | Reagan et al. | |
| 2006/0163403 | A1 | 7/2006 | Dickson | |
| 2006/0183362 | A1 | 8/2006 | Mullaney et al. | |
| 2006/0210230 | A1 | 9/2006 | Kline et al. | |
| 2007/0025675 | A1 | 2/2007 | Kramer | |
| 2007/0165995 | A1 | 7/2007 | Reagan et al. | |
| 2007/0189691 | A1 | 8/2007 | Barth et al. | |
| 2008/0035778 | A1 | 2/2008 | Belden et al. | |
| 2008/0037945 | A1 | 2/2008 | Gniadek et al. | |
| 2008/0218947 | A1 | 9/2008 | Atkinson | |
| 2008/0315030 | A1 | 12/2008 | Hendrickson et al. | |
| 2009/0190894 | A1 | 7/2009 | Nhep et al. | |
| 2010/0054680 | A1 | 3/2010 | Lochkovic et al. | |
| 2010/0166376 | A1 | 7/2010 | Nair et al. | |

FOREIGN PATENT DOCUMENTS

| | | | |
|---|---|---|---|
| DE | 42 26 368 | A1 | 2/1994 |
| DE | 1 107 031 | A1 | 6/2001 |
| EP | 0343057 | | 11/1989 |
| EP | 0343057 | A1 | 11/1989 |
| EP | 1041417 | | 10/2000 |
| EP | 1041417 | A2 | 10/2000 |
| FR | 2566997 | | 1/1986 |
| FR | 2586822 | | 3/1987 |
| FR | 2586822 | A1 | 3/1987 |
| FR | 2739460 | | 4/1997 |
| FR | 2739460 | A1 | 4/1997 |
| JP | 9-236709 | | 9/1997 |
| JP | 11-349230 | | 12/1999 |
| JP | 2003114339 | | 4/2003 |
| JP | 2005-73365 | | 3/2005 |
| JP | 2005-249858 | | 9/2005 |
| WO | PCT/IT/00055 | | 11/1993 |
| WO | PCT/US03/05238 | | 9/2003 |
| WO | PCT/US03/005238 | A2 | 9/2003 |
| WO | PCT/US2006/014764 | | 10/2006 |
| WO | PCT/US2006/014764 | A2 | 10/2006 |

OTHER PUBLICATIONS

ADC Telecommunications, Inc., Indoor Fiber Distribution Terminals—CPE, at www.adc.com/productsandservices (undated).

Multilink, Inc., 2007 Multilink Catalog, vol. 24, at p. 87-94.

7 Inch Modules, ADC Telecommunications, Inc, © 1998, "7 Inch Connector Module with IFC", pp. 127.

Description of Admitted Prior Art, 30 pages.

F3DF Modules, ADC Telecommunications, Inc. © 1995, "Individual 12-Pack Assemblies", pp. 90.

Fiber Cable Management Products, Third Edition, ADC Telecommunications, Inc., © 1995, 1998.

Fiber Distribution Frame, Pre-Terminated Rear Load Connector Module, Installation Instructions, ADC Telecommunications, Inc., © 2000.

(56) References Cited

OTHER PUBLICATIONS

Fiber Main Distribution Frame (FMDF), Fiber Terminal Block, Installation Instructions, ADC Telecommunications, Inc., © 2001.
Fiber Panel Products—Cable Management Tray Panels, ADC Telecommunications, Inc., © 1994, 1996 "72 Fiber Distribution Module (FDM) with Intrafacility Fiber Cable", pp. 56.
Fiber Panel Products, Second Edition, ADC Telecommunications, Inc., © 1994, 1996.
FL2000 Products—Preconfigured Panels, ADC Telecommunications, Inc., © 2000 "Rack or Cabinet Mount Termination Panel with Multifiber Cable", pp. 13.
FL2000 Products, ADC Telecommunications, Inc., © 1994, 1996.
FL2000 Products, ADC Telecommunications, Inc., © 1994, 1996, "Rack Mount Panel with Intrafacility Fiber Cable", pp. 16.
IFC Style Frame Modules, ADC Telecommunications, Inc., © 1995, "Connector Module Equipped with IFC", pp. 27.
Next Generation Frame (NGF), Product Family Ordering Guide, ADC Telecommunications, Inc., © 1996, 1999, 2000, "Fiber Termination Blocks (FTB) Preterminated", pp. 8.
Next Generation Frames—Fiber Termination Blocks, ADC Telecommunication, Inc., © 1998, "Fiber Termination Blocks (FTB) Preterminated" pp. 6.
Value-Added Module System, ADC Telecommunications, Inc., © 1993, 1194, 1998, "12-Pack Module Assemblies", pp. 30-31.
Corning Cable Systems, Wall-Mountable Connector Housings (WCH), at www.corningcablesystems.com (undated).
ADC Telecommunications, Inc., Indoor Fiber Distribution Terminals—CPE, at www.adc.com/productsand services/ (undated).
Multilink, Inc., 2007 Multilink Catalog, vol. 24, at pp. 87-94.

* cited by examiner

FIBER OPTIC CABLE DISTRIBUTION BOX

Matter enclosed in heavy brackets [ ] appears in the original patent but forms no part of this reissue specification; matter printed in italics indicates the additions made by reissue.

CROSS REFERENCE TO RELATED APPLICATION

This application is a continuation of U.S. patent application Ser. No. 11/728,785 filed Mar. 27, 2007 now U.S. Pat. No. 7,400,814, and entitled "Wall-Mountable Optical Fiber and Cable Management Apparatus". The '785 application claims priority under 35 U.S.C. § 119(e) of U.S. Provisional Patent Application No. 60/880,169 filed Jan. 13, 2007, and entitled "Multidwelling Unit (MDU) Drop Box for Fiber Optic Cables".

BACKGROUND OF THE INVENTION

1. Field of the Invention

The present invention relates to drop or distribution boxes for managing fiber optic cables in the deployment of fiber optic networks at subscriber premises.

2. Discussion of the Known Art

The deployment of fiber optic networks at multi-dwelling units (MDUs) and other subscriber premises, requires the use of so-called cable drop or distribution boxes that are designed for mounting on walls or other structures at the premises. Current industry practice calls for the boxes to have a cable entry port at the left side of the box for receiving a fiber optic cable originating from the network provider, and one or more ports at the right side of the box through which a number of fibers associated with individual subscribers at the premises are routed to connect with fibers in the provider cable. See, for example, Corning Cable Systems, Wall-Mountable Connector Housings, at <www.corningcablesystems.com>, and ADC Telecommunications, Indoor Fiber Distribution Terminals—Customer Premises Equipment (CPE), at <www.adc.com/productsandservices/>. See also, 2007 Multilink Catalog, vol. 24, at pages 87-94, disclosing a family of wall mountable fiber optic cable enclosures available from Multilink, Inc., of Elyria, Ohio, USA.

U.S. Pat. No. 4,976,510 (Dec. 11, 1990) discloses a wall communications outlet wherein cables may enter the outlet through panels inserted at sides of the outlet, or through an opening formed in a backplate of the outlet. Two sets of sidewalls are arranged concentric with the opening in the backplate so that spare lengths of optical fibers can be placed between the sidewalls, according to the patent. International Application No. PCT/IT92/00055 published Nov. 11, 1993, discloses a distribution device for termination of optical ribbon cables. The device has two circular grooves about which a ribbon, and fibers of the ribbon, are wound.

Installation of the known cable boxes by a single worker at a subscriber premises can be difficult and time consuming, however. Further, the known boxes are dimensioned to accommodate older types of fiber optic cables which can not tolerate bend diameters of less than three inches (76.2 mm) without impairing cable performance. Accordingly, the currently available boxes are relatively large, and are not well-suited for widespread deployment of fiber optic networks at multi-dwelling units or other kinds of premises without significant expenditures of time and labor.

SUMMARY OF THE INVENTION

According to the invention, a fiber optic cable distribution box includes an interface compartment for interfacing a first set of fibers when routed inside the compartment, with a second set of fibers associated with a cable routed to the box. A drum region extends beneath the interface compartment and includes a cylindrical wall having an axis for supporting a length of a cable wound about the wall. The drum region is constructed so that the box can turn about the axis of the cylindrical wall when a cable is paid out from the drum region. The interface compartment and the drum region are arranged so that the first set of fibers inside the interface compartment, originate from an inside end portion of the cable wound about the wall of the drum region.

For a better understanding of the invention, reference is made to the following description taken in conjunction with the accompanying drawing and the appended claims.

DETAILED DESCRIPTION OF THE INVENTION

Figure 1:
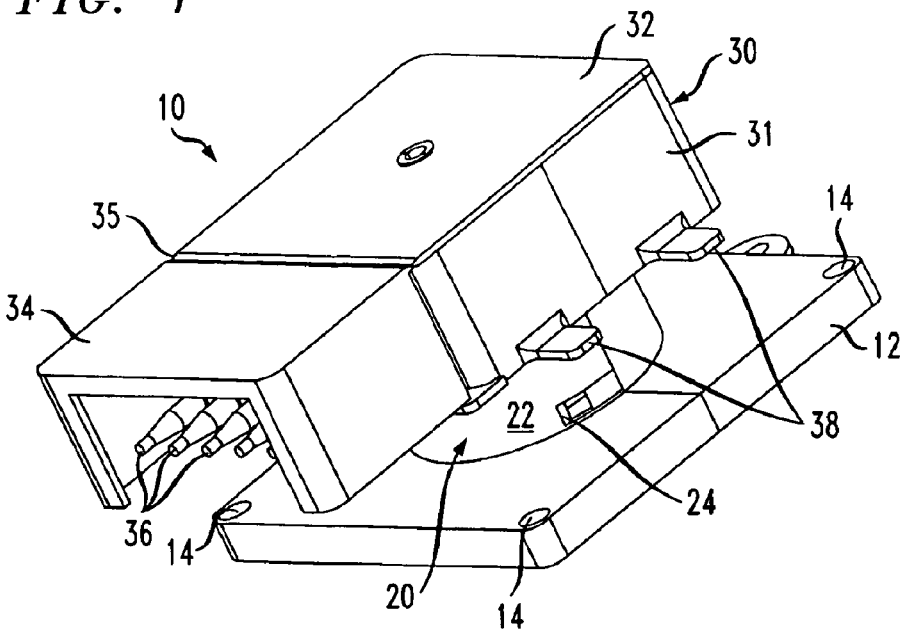
FIG. 1 is a perspective view of a first embodiment of a fiber optic cable distribution box according to the invention.

FIG. 1 shows a first embodiment of a fiber optic cable drop or distribution box 10 according to the invention. The box 10 may be constructed of sheet metal, and/or plastics materials such as, without limitation, ABS or polycarbonate. Moisture proof seals, gaskets and the like may also be provided on or within the box 10 in a known manner if the box will be mounted outdoors at a subscriber premises. The box 10 has a base 12 which, in the disclosed embodiment, is generally square and measures, e.g., about 6.25 inches (158.75 mm) long on each side with mounting holes 14 formed at each corner of the base.

The box 10 also has a drum region 20 that extends axially upward from a central portion of the base 12. The drum region 20 includes an outer cylindrical wall 22 the outside periphery of which is partially visible in FIG. 1. The outside diameter of the wall 22 is sufficient to allow a length of a fiber optic cable (not shown) to be wound on the drum wall 22 for storage or retention, with at least the minimum bend diameter specified for the cable. For example, when using cables of Allwave® Flex™ fiber available from OFS Fitel, the outside diameter of the drum wall 22 can be about 3.0 inches (76.2 mm) or less. An inside end portion of the cable enters a cable entry port in the drum wall while being supported over a substantially straight path by a strain relief device 24 fitted within the entry port. The device 24 is described further below in connection with FIGS. 7 to 9B, and it guides the end portion of the cable through the cylindrical wall 22 along a line tangential to the circumference of the wall at the location of the device 24.

The cable distribution box 10 also has an interface compartment 30 that is disposed atop the drum region 20, and which has a peripheral side wall 31. In the embodiment of FIG. 1, the compartment 30 has a removable cover lid 32 constructed and arranged to permit an installer to access the interior of the compartment 30 from outside, and a connector guard or cover 34 that is hinged to the lid at 35. As explained below, the interface compartment 30 is dimensioned and formed to allow a first set of optical fibers that enter the compartment 30 and originate either from a cable wound over the drum region 20, or from a cable that enters a port in the compartment wall 31 (see FIGS. 2 and 3), to connect with a second set of optical fibers from another cable which fibers terminate in connectors 36 seen beneath the cover 34 in FIG. 1. A number of flat fingers or tabs 38 are formed to project outward from lower side edges of the compartment wall 31, and are parallel to the base 12. The tabs 38 and the base 12 together serve to confine a length of cable wound about the drum wall 22, in the region between the base and the interface compartment 30.

Figure 2:
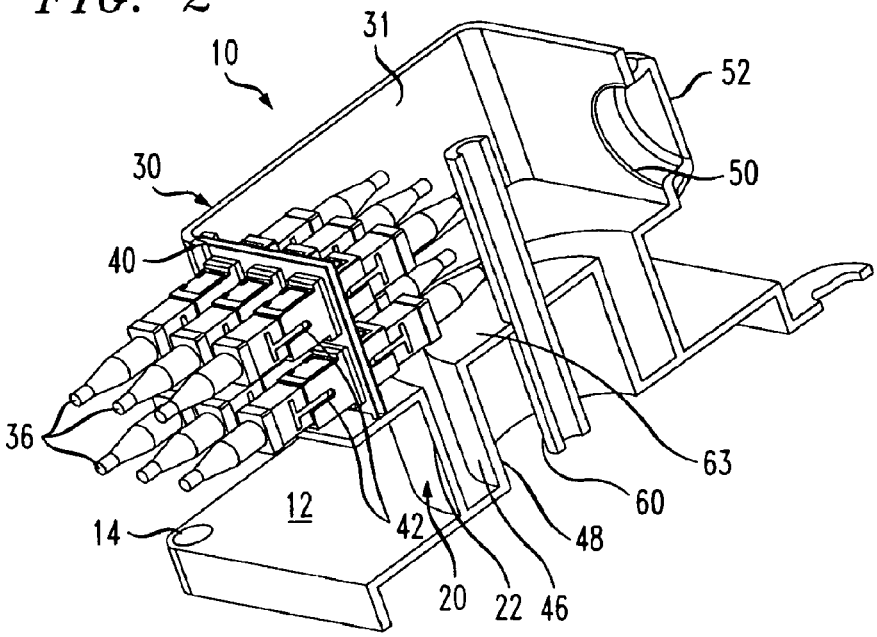
FIG. 2 is a cross-sectional elevation view of the box of FIG. 1, showing a cable drum region and other internal components of the box.
Figure 3:
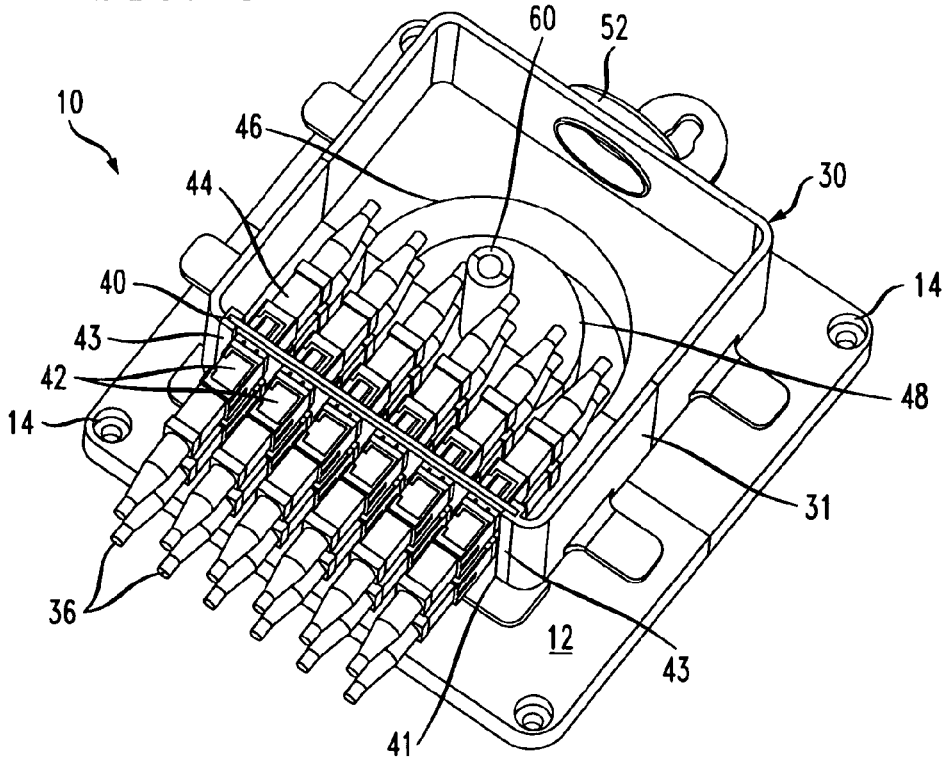
FIG. 3 is a view of the box of FIG. 1 as seen from the top with a cover lid removed.

FIG. 2 is a cross sectional view in elevation of the box 10 in FIG. 1, and FIG. 3 is a view of the box 10 as seen from the top with the cover lid 32 removed. The interface compartment 30 features a connector panel 40 that is supported to occupy a cut out region 41 in the compartment sidewall 31. A number of optical connector adapters 42 are mounted to extend through corresponding openings in the panel 40, and the adapters 42 operate to couple the fiber optic connectors 36 at the external side of the panel 40, with corresponding connectors 44 at the internal side of the panel. Preferably, the panel 40 is mounted in the sidewall 31 so that it can be easily removed and exchanged with another panel of the same dimensions but in which adapters of a different type are mounted. For example, the panel 40 may be slid in or out of vertical channels 43 formed at both ends of the sidewall cut out region 41. A desired panel 40 may then be selected from among a number of different panels having adapters 42 which accommodate, for example, type LC, SC, FC, ST, MPO, or type MPX connectors, depending on the type of cable connectors used at a given deployment.

As mentioned, optical fibers routed into the interface compartment 30 may originate from the inside end portion of a cable wound over the drum region 20 and which passes through the drum wall 22 via the strain relief device 24. In such an application, the fibers are routed through an annular fiber routing region 46 that extends between the outer cylindrical wall 22, and an inner cylindrical wall 48 of the drum region which wall 48 is formed radially inward of the outer wall 22. The strain relief device 24 and the dimensions of the annular fiber routing region 46, are such that individual optical fibers will not be subject to a bend diameter less than that specified for the fibers before entering the interface compartment 30 and terminating in the connectors 44. For example, when using cables of Allwave® Flex™ fiber available from OFS Fitel, the inner wall 48 may have an outside diameter as small as 0.7874 inches (20 mm), and the mean diameter of the fiber routing region 46 may only be about 2.0 inches (50.8 mm).

The sidewall 31 of the interface compartment 30 also has a cable entry or pass through port 50 (FIGS. 2 & 3) in a rear section of the wall 31 for receiving an outside fiber optic cable or cable assembly (not shown) whose fibers are to be coupled with those fibers terminated by the connectors 36. Alternatively, the cable entry port 50 may be provided in the form of a large opening through a portion of an alternate connector panel 40 (not shown). In such applications, the fibers of the cable entering the rear port 50 may be routed directly to corresponding ones of the connectors 44 with little, if any, bending whatsoever. Moreover, the use of multifiber connectors such as type MPO in the connector panel 40 enables the box 10 to act as an aggregation box. That is, multiple cables originating from other like boxes at different levels of a multi-dwelling unit (MDU) may enter the rear port 50 of the interface compartment 30, to connect via the MPO connectors with a single cable routed to the box from an alternate location, e.g., the basement of the MDU. See FIG. 13 and related text below. If not used, the rear cable entry port 50 is preferably kept closed by a plug 52.

Figure 4:
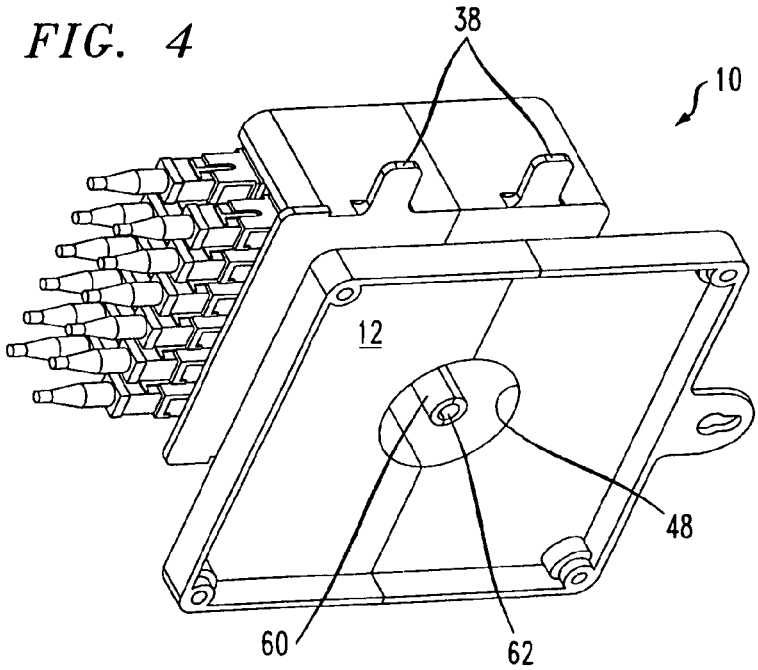
FIG. 4 is a view of the box of FIG. 1 as seen from below.

FIG. 4 is a bottom view of the cable box 10 of FIG. 1. A cylindrical tube 60 is formed with a central axial passage 62. The tube 60 extends axially between a top end of the tube 60 that fits through a clearance opening in the cover lid 32 to lie flush with the lid's top surface as shown in FIG. 1, and a bottom end of the tube where the tube passage 62 opens beneath the base 12 as seen in FIG. 4. The axis of the tube passage 62 coincides with the axis of the outer cylindrical wall 22 of the drum region 20. In the disclosed embodiment, the tube 60 extends above and below the center of a wall 63 that closes an upper axial end of the inner cylindrical wall 48, as seen in FIG. 2.

The diameter of the central passage 62 in the tube 60 is preferably sufficient to allow a long narrow tool such as a screwdriver shaft, bolt or other payoff mandrel, to be inserted through the passage from above or below the box 10 so that the tool will act as a spindle about which the box 10 can turn freely. This construction allows a single worker easily to pay out a cable wound on the drum region 20, as may be necessary for a network deployment at a MDU. For example, while holding the handle of an inserted screwdriver in one hand, the worker can use his or her other hand to pull and unwind a desired length of the cable from the drum region 20 while the box 10 is free to turn about the screwdriver shaft.

Figure 5:
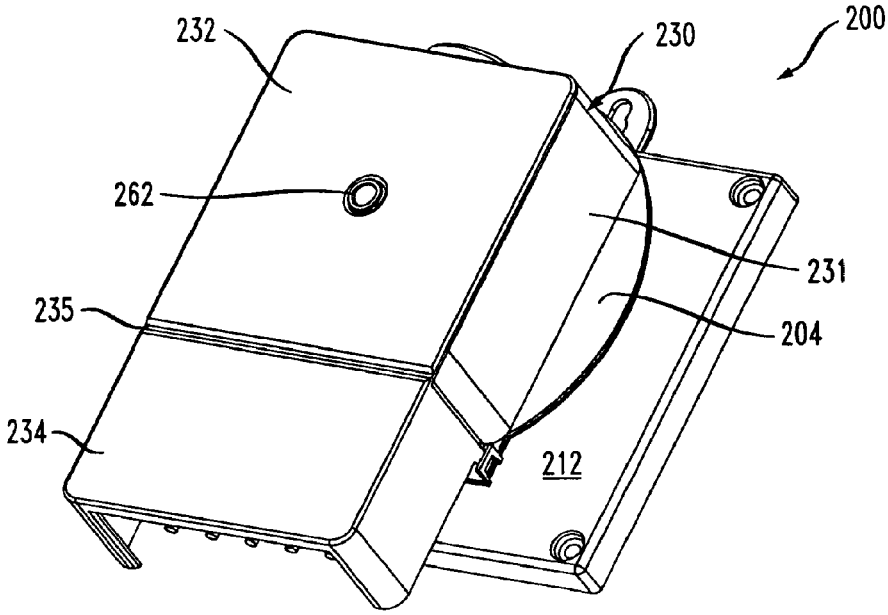
FIG. 5 is a perspective view of a second embodiment of a fiber optic cable distribution box according to the invention.
Figure 6:
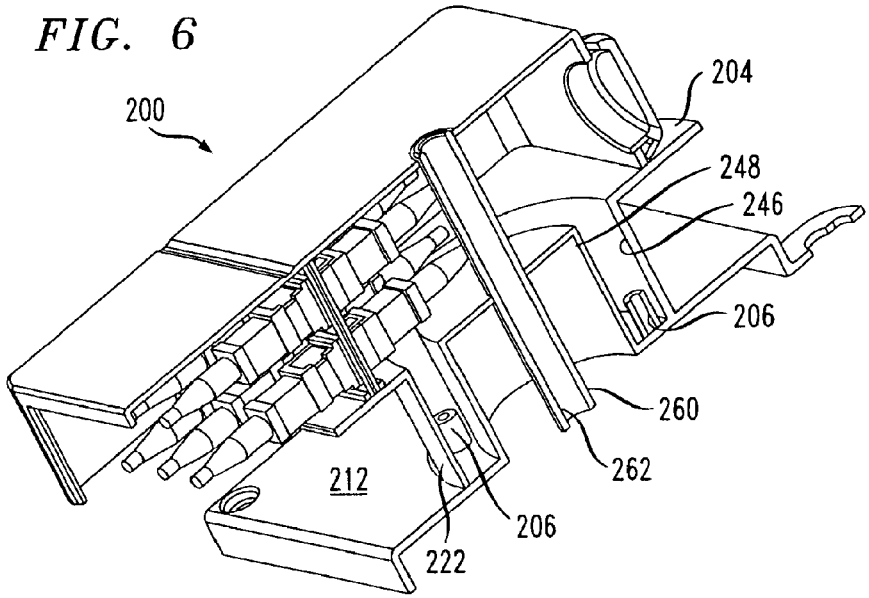
FIG. 6 is a cross-sectional elevation view of the box of FIG. 5.
Figure 7:
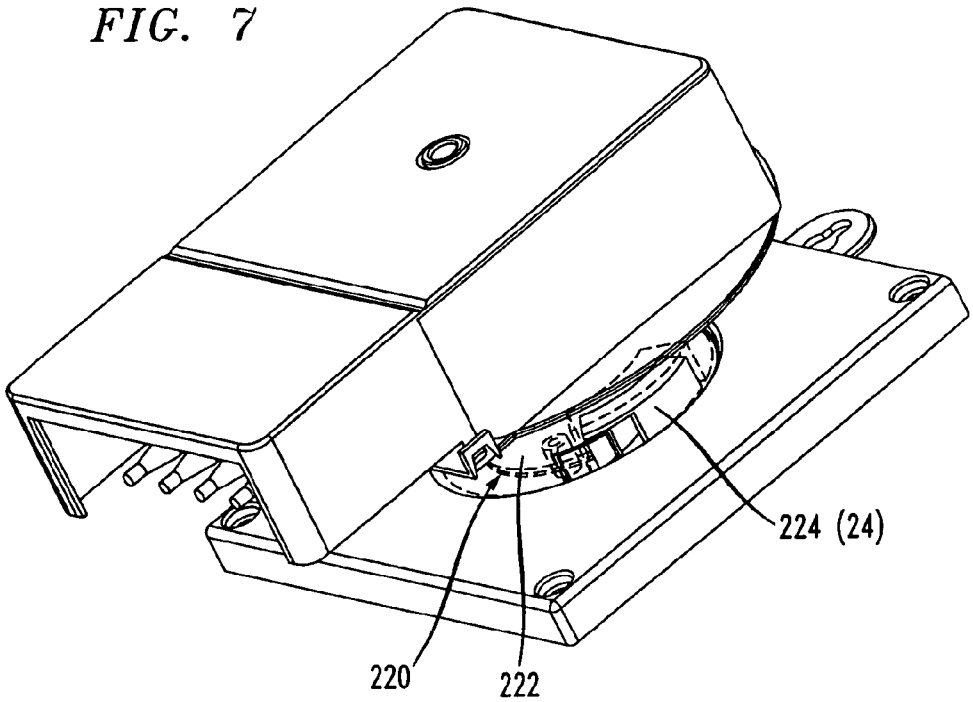
FIG. 7 is a side view of the box of FIG. 5, showing the location of a cable strain relief device according to the invention.

FIGS. 5 to 7 show a second embodiment of a cable distribution box 200 according to the invention. Components of the box 200 that are identical or similar to those of the box 10 of FIGS. 1 to 4, have corresponding reference numerals increased by 200.

The box 200 has a single piece cover lid 232 with an integrated hinge 235 for a connector guard or cover 234. Further, a side wall 231 of an interface compartment 230 has a continuous circular disk flange 204 that extends radially outward beneath the compartment 230, parallel to a base 212 of the box. The flange 204 and the base 212 together serve to confine a length of fiber optic cable wound on the outer cylindrical wall 222, within the region between the flange 204 and the base 212. As with the box 10 of FIGS. 1 to 4, an inside end portion of the cable is guided by a strain relief device 224 to enter an annular fiber routing region 246 inside the box 200, over a substantially straight path tangential to the circumference of the wall 222 at the location of the device 224.

Also, as seen in FIG. 6, the base 212 of the box 200 may be formed as a separate piece that is fastened to the bottom of the drum region 220 by, e.g., screws or other fasteners that are formed to engage collars 206 fixed at the bottom of the annular fiber routing region 246.

Figure 8:
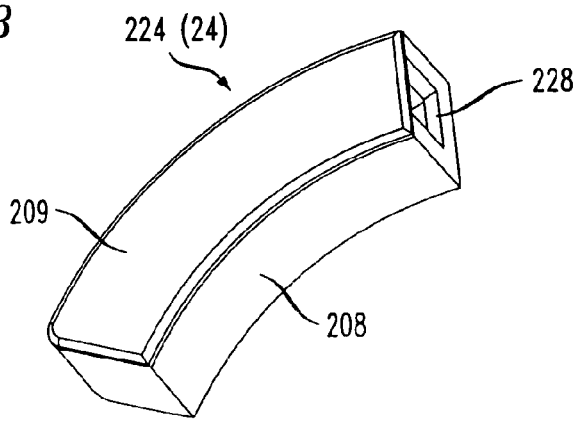
FIG. 8 is an enlarged perspective view of the cable strain relief device.
Figure 9:
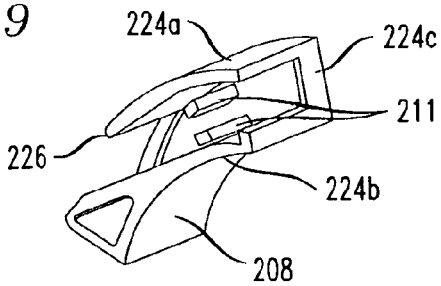
FIG. 9 is a view of the strain relief device in FIG. 8 with a top cover removed.

FIG. 8 is an enlarged, perspective view of the strain relief device 224 which corresponds to the strain relief device 24 provided in the box 10 in FIG. 1. As seen in FIG. 9, the strain relief device 224 is comprised of an arcuately shaped device body 208 with a generally U-shaped cross section having an outer side wall 224a, an inner side wall 224b, a base wall 224c, and a cover 209 that fits atop and extends between the side walls 224a, 224b of the device.

Figure 9A:
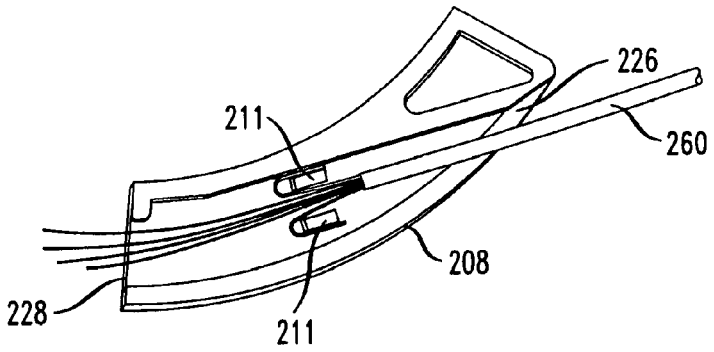
FIG. 9A is also a view of the strain relief device without the top cover, and shows a fiber optic cable entering one end of the device and individual fibers of the cable exiting from an opposite end of the device.

Further, as shown in FIG. 9A, the outer side wall 224a has an opening 226 at one end of the device 224 for receiving the inner end portion of, e.g., a flat ribbon fiber optic cable 260 wound on the outer cylindrical wall 222 of the drum region 220. An opening 228 at the opposite end of the device 224 allows individual fibers of the cable to exit from the device and to enter the fiber routing region 246 of the box 200, preferably after each fiber is protected with, for example, a commercially available 900 μm sleeve.

Figure 9B:
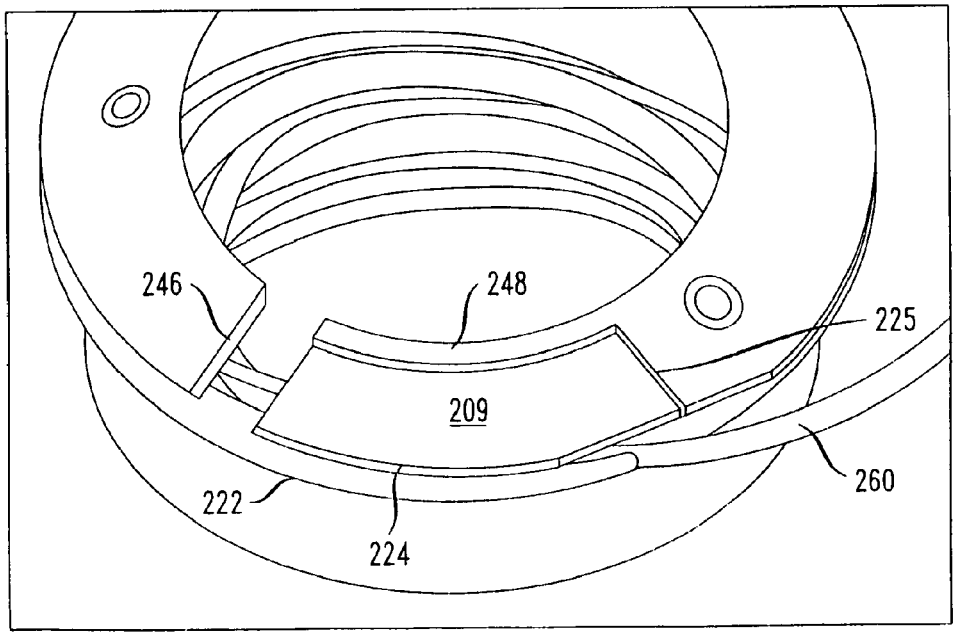
FIG. 9B shows the strain relief device in place in the drum region of the box.

The cable 260 and its individual fibers are guided over a substantially straight path between the device openings 226, 228, with the aid of a pair of parallel fingers or guides 211 that project upward from the base wall 224c of the device 224 as seen in FIGS. 9 and 9A. After outer jacketing is stripped away from the end portion of the cable 260, lengths of an arimid or Kevlar® yarn that surrounds the cable fibers and serves as a reinforcing or strength material for the cable, are wrapped about and secured to the guides 211 with an epoxy or other suitable adhesive. Commercially available protective sleeves (e.g., 900 μm) are placed over each of the individual cable fibers, and the sleeved fibers are guided out of the device opening 228. The device cover 209 is fixed to the body 208 via a suitable adhesive, and the assembled cable strain relief device 224 is fixed securely within a cable entry port 225 defined between the outer cylindrical wall 222 and the inner cylindrical wall 248 of the drum region 220, as shown in FIG. 9B.

Accordingly, the inside end portion of the cable 260 and its individual fibers pass tangentially with respect to the outer cylindrical wall 222 through the cable entry port 225 in the wall, and into the annular fiber routing region 246 of the box 200. Because the yarn surrounding the fibers is anchored to the guides 211 of the strain relief device 224, any force applied externally to the cable 260 when the cable is being wound on or off the outer cylindrical wall 222 of the drum region, will be transferred to the wall 222 in which the device 224 is fixed rather than to the fibers themselves.

Figure 10:
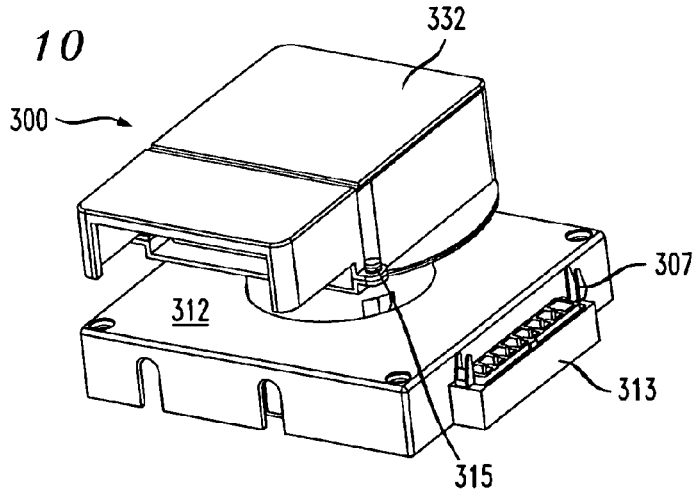
FIG. 10 is a perspective view of a third embodiment of a fiber optic cable distribution box according to the invention.
Figure 11:
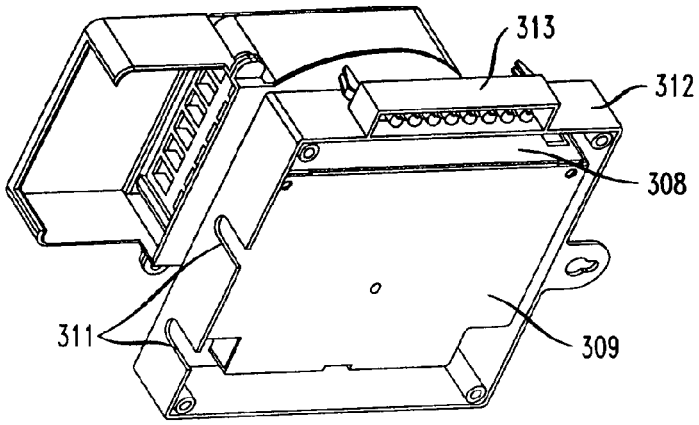
FIG. 11 is a view of the box of FIG. 10 as seen from below.
Figure 12:
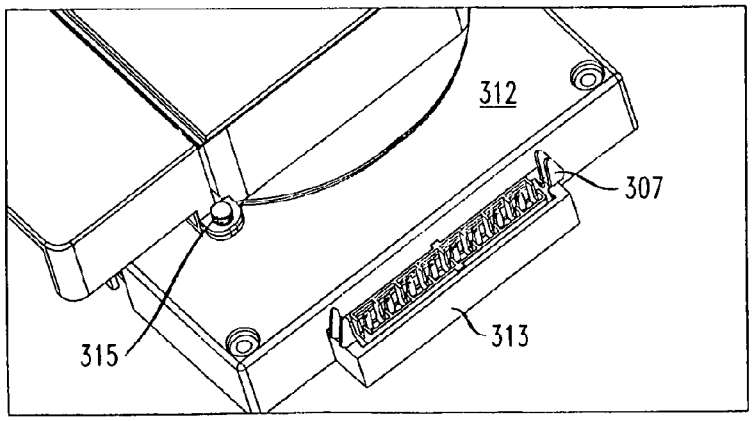
FIG. 12 is a perspective view of a connector parking area on a base of the box of FIG. 10.

FIGS. 10 to 12 show a third embodiment of a cable distribution box 300 according to the invention. Components of the box 300 that are identical or similar to those of the box 10 of FIGS. 1 to 4, have corresponding reference numerals increased by 300. The box 300 features an integral splice compartment 308 in its base 312, a connector parking area 313, and a number of security latch holes 315.

Splice Compartment 308

Typical MDU cable distribution box installations have single fiber breakouts that egress from the box, wherein each breakout is associated with a corresponding living unit of the premises where the box is installed. Single fiber cables from each living unit are often routed to a box without a terminating connector. The bare ends of these cables can be terminated at the box in various ways. For example, single ended fiber pigtails can be spliced within the box so that splice sleeves are housed in a common space. This requires a chamber or compartment to house the splice in order to prevent damage and to manage fiber slack. Alternatives may include mechanical splicing of the pigtails, which would require a similar chamber or housing. The individual single fiber cables may also be terminated directly with a field installable connector, thus obviating the need for a splice chamber.

The box 300 has an integrated splice chamber or compartment 308 attached or formed underneath the base 312, including a splice tray 309 mounted inside the base. The splice tray 309 may be fixed within the box 300, or affixed directly to a wall. In either case, the box 300 may be installed over the splice compartment 308. Pigtails or terminated ends can then enter or exit a lower section of the compartment through corresponding clearance notches 311 that are cut in a side wall of the base 312.

Connector Parking Area 313

The connector parking area or block 313 allows terminated fiber ends to be stored while not in use. The block 313 is constructed and dimensioned to receive and secure a selected one of a number of different commercially available connector parking strips 307 (e.g., type SC) in the block 313. This feature enables the future use of alternate connector types without having to replace the box 300, but at the same time allows installers to forego parking

Latch Holes 315

Several latch or security holes 315 may be formed through corresponding feet on the hinged cover lid 332. The latch holes 315 allow the end user to utilize a number of safety lockout methods. For example, one hole 315 can be used with a standard plunger type latching mechanism simply to keep the lid closed. Other holes 315 can be used to receive wire ties, lockout tags, or other security locks.

Figure 13:
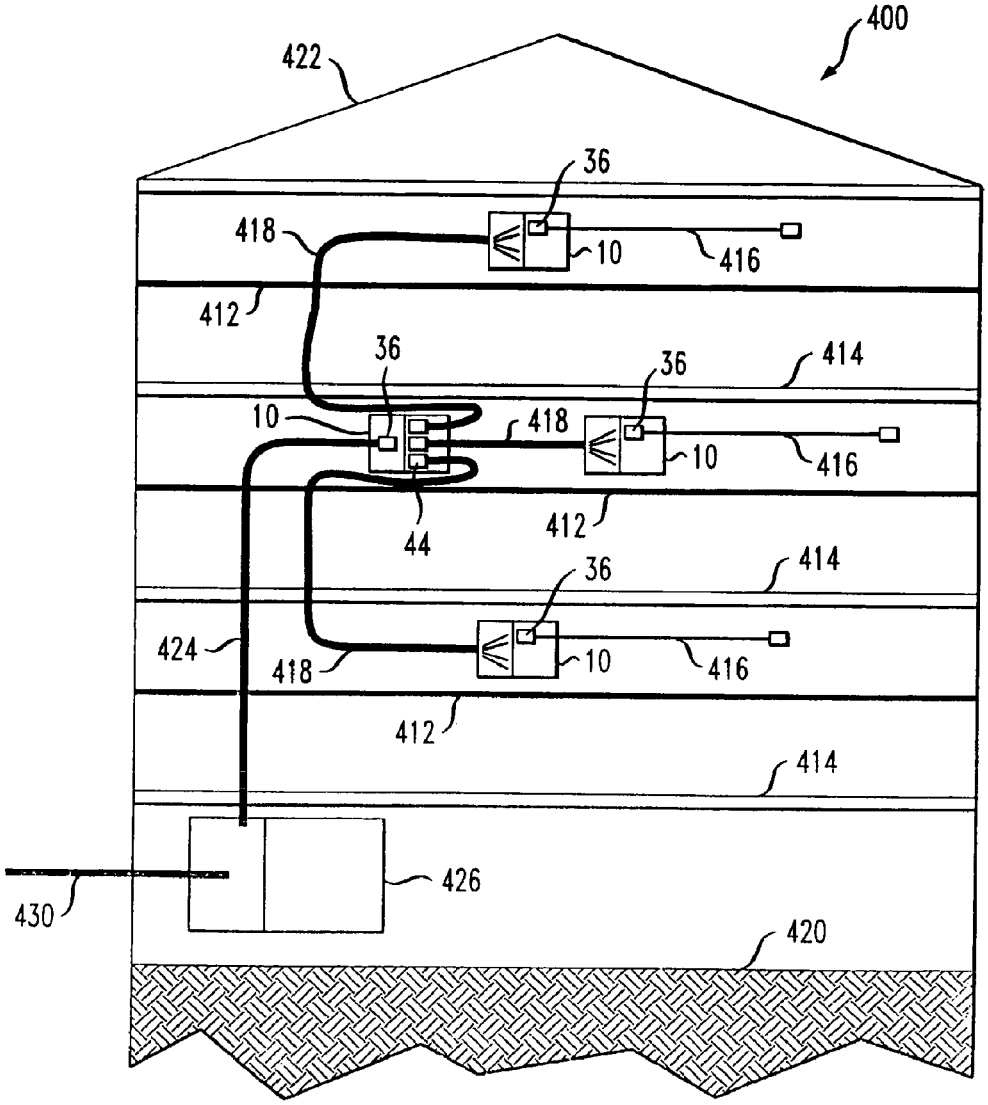
FIG. 13 is a schematic diagram showing a number of the inventive cable boxes deployed throughout a multidwelling unit (MDU) premises, according to the invention.

FIG. 13 illustrates an example of a fiber optic network deployment at a multi-dwelling unit 400. A number of the inventive distribution boxes, for example, the box 10 of FIGS. 1 to 4, are mounted at corresponding locations in the MDU 400, for example, above a drop ceiling on each floor 414 of the MDU. Optical fibers 416 corresponding to network subscribers on a given floor 414 are terminated in the connectors 36 which, in turn, are connected to the adapters 42 on the external side of the box panel 40.

Each of the subscriber fibers 416 is connected with a corresponding fiber in a cable 418 associated with the box 10 in the ceiling of the subscriber's floor. The cable 418 may be wound initially about the drum region 20 of the box 10, to be partially or fully unwound later for routing to another box 10 that serves as an "aggregation" box which is located, e.g, between a basement 420 and a roof 422 of the MDU 400. The fibers of the cable 418 are terminated in the connectors 44 which, in turn, are connected to the adapters 42 on the internal side of the box connector panel 40.

At the aggregation box 10, each one of the cables 418 containing subscriber fibers from each floor of the MDU 400, enters the aggregation box through its rear pass through port 50 or a faceplate port. As mentioned earlier, the fibers of each cable 418 may be routed inside the box with little if any bending to connect via a multi-fiber connector 44 with a corresponding adapter 42 on the internal side of the box panel 40. A main fiber optic cable 424 serving all subscribers in the MDU 400, is routed between a cable entry box 426 in the basement 420, and the aggregation box 10 in which the main cable fibers connect to the adapters 42 on the external side of the box panel 40 via multifiber connectors 36. A network provider cable 430 is routed to the entry box 426 from outside the MDU 400, and fibers of the cable 430 are connected to corresponding subscriber fibers of the cable 424 inside the entry box 426.

The various embodiments disclosed herein incorporate the following important features in a fiber optic cable distribution box.

1. Reduced physical dimensions for use with newer types of fiber optic cable such as Allwave® Flex™ available from OFS Fitel and which have superior bending performance.

2. An axial drum region that provides for external cable storage and keeps internal fiber routing within safe bending limits.

3. A central through tube that facilitates pay-off of cable wound externally on the drum region, with the use of a common tool such as a screwdriver.

While the foregoing represents preferred embodiments of the invention, it will be understood by those skilled in the art that various modifications and changes may be made without departing from the spirit and scope of the invention, and that the invention includes all such modifications and changes as come within the scope of the following claims.

We claim:

1. A fiber optic cable distribution box, comprising:

an interface compartment constructed and arranged for interfacing a first set of fibers when routed inside the compartment, with a second set of fibers [associated with a fiber optic cable that is] routed to the box;

a drum region extending beneath the interface compartment, wherein the drum region includes a [first cylindrical] *drum* wall having an axis, the *drum* wall [is] *being* dimensioned to support a length of a first fiber optic cable wound about the *drum* wall, and the drum region [is] *being* constructed and arranged so that the distribution box can turn about the axis of the [cylindrical] *drum* wall when [a] *the first* cable is paid out from the drum region; [and]

the interface compartment and the drum region [are] *being* constructed and arranged so that the first set of fibers inside the interface compartment[,] originate from [an inside end portion of] the *first* cable [wound about the first cylindrical wall of the drum region] *and the fiber optic cable distribution box being constructed and arranged such that the interface compartment and the drum region are configured to be mounted to a wall together with one another*.

2. A cable distribution box according to claim 1, including a tube arranged to extend coaxially through the drum region, and the tube has a central passage through which an outside shaft or spindle is insertable.

3. A cable distribution box according to claim 1, wherein a first cable entry port is formed in [the] *a* first cylindrical wall of the drum region for receiving the inside end portion of the first fiber optic cable.

4. A cable distribution box according to claim 1, wherein the drum region includes a second cylindrical wall arranged radially inward and coaxially with [the] *a* first cylindrical wall, and an annular fiber routing region is defined between the first and the second walls.

5. A cable distribution box according to claim 3, including a strain relief device arranged at the first cable entry port for guiding the inside end portion of the first fiber optic cable through the first cylindrical wall over a path tangential to the circumference of the wall.

6. A cable distribution box according to claim 5, wherein the strain relief device is constructed and arranged to transfer a pull force applied externally to the first fiber optic cable, to the first cylindrical wall of the drum region when the cable is wound on or off the drum region.

7. A cable distribution box according to claim 5, wherein the strain relief device includes one or more guides for securing a strength material beneath an outer jacket of the cable.

8. A cable distribution box according to claim 1, wherein the interface compartment includes a connector panel, and a number of connector adapters mounted in the panel for coupling fiber optic connectors at an externally facing side of the panel, with corresponding fiber optic connectors at an internally facing side of the panel.

9. A cable distribution box according to claim 8, wherein the interface compartment is constructed and arranged to support the connector panel so that a first connector panel can be removed and exchanged with a second connector panel having connector adapters of a type different from a type of adapters mounted in the first connector panel.

10. A cable distribution box according to claim 1, wherein the interface compartment has a side wall, and a number of fingers or tabs that project outward from the side wall for confining the length of the first fiber optic cable when wound about [the] *a* first cylindrical wall of the drum region.

11. A cable distribution box according to claim 1, including a disk flange that extends radially outward beneath the interface compartment for confining the length of the first fiber optic cable when wound on [the] *a* first cylindrical wall of the drum region.

12. A cable distribution box according to claim 1, wherein the interface compartment has a side wall, and the side wall has a second cable entry port for receiving a fiber optic cable or cable assembly having a third set of fibers to be coupled via the connector panel with the second set of fibers of the second fiber optic cable routed to the box.

13. A cable distribution box according to claim 8, wherein one or more of the adapters mounted in the connector panel of the interface compartment are constructed and arranged to couple multi-fiber type connectors with one another.

14. A cable distribution box according to claim 1, including a length of the first fiber optic cable wound about [the] *a* first cylindrical wall of the drum region, and a fiber optic connector for terminating an outside end of the cable.

15. A cable distribution box according to claim 14, wherein the fiber optic connector at the outside end of the cable is a multi-fiber type of connector.

*16. The cable distribution box of claim 1, wherein the cable distribution box includes a mounting plate for mounting the cable distribution box to a wall.*

*17. The cable distribution box of claim 16, wherein the mounting plate is non-rotatable relative to the interface compartment and the drum wall.*

*18. The cable distribution box of claim 1, wherein the cable distribution box includes a mounting feature for mounting the cable distribution box to a wall.*

*19. The cable distribution box of claim 18, wherein the mounting feature includes at least one fastener opening for receiving a fastener for securing the cable distribution box to the wall.*

*20. The cable distribution box of claim 1, wherein a cable storage region surrounds the drum wall, wherein the first*

*cable is coiled about the drum wall in a direction extending from an inside of the cable storage region toward an outside of the cable storage region, and wherein at least the first set of fibers extend from directly inside of the cable storage region into the interface compartment.*

*21. The cable distribution box of claim 1, wherein a cable storage region surrounds the drum wall, wherein the first cable is coiled about the drum wall in a direction extending from an inside of the cable storage region toward an outside of the cable storage region, and wherein at least the first set of fibers extend from the inside of the cable storage region into the interface compartment without any intermediate coiling of the first set of fibers.*

*22. The cable distribution box of claim 1, wherein an outer end of the first cable is terminated by a multi-fiber connector.*

*23. The cable distribution box of claim 1, wherein the drum region is mounted beneath a back wall of the interface compartment, wherein a cable storage region surrounds the drum wall, wherein the first cable is coiled about the drum wall in a direction extending from an inside of the cable storage region toward an outside of the cable storage region, and wherein at least the first set of fibers extend from the inside of the cable storage region into the interface compartment through the back wall.*

*24. The cable distribution box of claim 1, further comprising a plurality of fiber optic adapters mounted at least partially within the interface compartment, the fiber optic adapters having first ports that receive fiber optic connectors associated with the first set of fibers, the fiber optic adapters, the interface compartment and the drum region being configured to rotate together in unison about the axis when the first cable is paid off from the drum region.*

*25. The cable distribution box of claim 24, wherein the cable distribution box defines an opening that extends along the axis, the opening being configured for receiving a mandrel about which the cable distribution box rotates when the first cable is paid off from the drum region.*

*26. The cable distribution box of claim 24, wherein the fiber optic adapters include second ports that are accessible from outside the interface compartment.*

*27. The cable distribution box of claim 1, wherein the drum wall has an outside diameter of 3 inches or less.*

* * * * *

UNITED STATES PATENT AND TRADEMARK OFFICE

CERTIFICATE OF CORRECTION

PATENT NO. : RE45,153 E
APPLICATION NO. : 13/091851
DATED : September 23, 2014
INVENTOR(S) : Hendrickson et al.

It is certified that error appears in the above-identified patent and that said Letters Patent is hereby corrected as shown below:

Column 1, line 8, above the heading, "CROSS-REFERENCE TO RELATED APPLICATIONS" insert -- Notice: More than one reissue application has been filed for the reissue of U.S. Patent No. 7,522,806. The reissue applications are U.S. application Nos. 14/492,970, filed on September 22, 2014, which is a continuation reissue application of a reissue application No. 13/091,851 (the present application), filed on April 21, 2011, now U.S. Patent No. RE45,153 E. --.

Signed and Sealed this
Seventeenth Day of May, 2016

Michelle K. Lee

Michelle K. Lee
*Director of the United States Patent and Trademark Office*